(12) United States Patent
Voth et al.

(10) Patent No.: US 8,707,815 B2
(45) Date of Patent: Apr. 29, 2014

(54) POWER TRANSFER BOX LUBRICATION DEVICE

(75) Inventors: Danny G. Voth, Liberty, KS (US);
George W. Detrick, Coffeyville, KS (US)

(73) Assignee: Deere & Company, Moline, IL (US)

( * ) Notice: Subject to any disclaimer, the term of this patent is extended or adjusted under 35 U.S.C. 154(b) by 322 days.

(21) Appl. No.: 13/052,813

(22) Filed: Mar. 21, 2011

(65) Prior Publication Data

US 2012/0240703 A1    Sep. 27, 2012

(51) Int. Cl.
*F16H 57/04*    (2010.01)

(52) U.S. Cl.
USPC ....... 74/412 R; 74/606 R; 184/6.12; 184/6.26

(58) Field of Classification Search
USPC ................ 74/467, 606 R, 606 A, 607, 412 R; 184/6.12, 6.26, 13.1, 11.1, 11.2
See application file for complete search history.

(56) References Cited

U.S. PATENT DOCUMENTS

| | | | | |
|---|---|---|---|---|
| 783,826 | A | * | 2/1905 | Dinkel .......................... 239/523 |
| 2,121,401 | A | * | 6/1938 | Hollis ........................... 239/515 |
| D134,562 | S | * | 12/1942 | Murphy ........................ D23/213 |
| 2,571,768 | A | * | 10/1951 | Schlonau et al. ............. 239/513 |
| 2,726,897 | A | * | 12/1955 | Dupont ........................... 239/11 |
| 3,149,504 | A | * | 9/1964 | Brickett et al. ............. 74/606 R |
| 3,237,870 | A | * | 3/1966 | McCartney et al. .......... 239/424 |
| 3,308,681 | A | * | 3/1967 | Huber ......................... 74/606 R |
| 3,380,555 | A | | 4/1968 | Myers et al. |
| 3,738,452 | A | * | 6/1973 | Hausinger .................... 184/6.12 |
| 3,754,710 | A | * | 8/1973 | Chimura ....................... 239/597 |
| 4,168,033 | A | * | 9/1979 | von Bernuth et al. ........ 239/523 |
| 4,219,161 | A | * | 8/1980 | Freissle .......................... 239/523 |
| 4,273,287 | A | * | 6/1981 | Huber ........................... 239/299 |
| 4,346,849 | A | * | 8/1982 | Rood ............................ 239/597 |
| 4,429,587 | A | * | 2/1984 | Finn et al. ....................... 74/467 |
| 4,570,858 | A | * | 2/1986 | Bintner et al. ................ 239/390 |
| D285,828 | S | * | 9/1986 | Oyler et al. ................... D23/213 |
| 5,097,926 | A | * | 3/1992 | Duello ............................ 184/6.4 |
| 5,099,715 | A | * | 3/1992 | Baiker ............................ 74/467 |
| 5,190,222 | A | * | 3/1993 | Haruch ......................... 239/523 |
| 5,251,725 | A | * | 10/1993 | Barrett, Jr. .................. 184/6.14 |
| 5,522,477 | A | * | 6/1996 | Byrne .......................... 184/6.12 |
| 5,642,861 | A | * | 7/1997 | Ogi et al. ...................... 239/568 |
| 5,813,087 | A | * | 9/1998 | Huffman ......................... 15/321 |
| 2010/0140019 | A1 | * | 6/2010 | Imai et al. .................... 184/6.12 |

FOREIGN PATENT DOCUMENTS

| | | |
|---|---|---|
| DE | 102008040268 | 2/2010 |
| JP | 56153697 | 11/1981 |
| WO | 8807641 | 10/1988 |

OTHER PUBLICATIONS

European Search Report, Jun. 12, 2012, 9 pages.

* cited by examiner

*Primary Examiner* — Troy Chambers
*Assistant Examiner* — Valentin Craciun
(74) *Attorney, Agent, or Firm* — Quarles & Brady LLP

(57) ABSTRACT

A vehicle having a power generating device and a power transfer device. The power transfer device includes a plurality of gears in a housing within which the plurality of gears rotate. The plurality of gears include a first gear and a second gear, the first gear meshing with the second gear. The housing has a lubrication passage. The housing also has a lubrication slot and/or a spray nozzle in fluid communication with the lubrication passage. The lubrication slot and/or spray nozzle direct the fluid flowing therethrough toward where the first gear and second gear mesh.

12 Claims, 2 Drawing Sheets

POWER TRANSFER BOX LUBRICATION DEVICE

FIELD OF THE INVENTION

The present invention relates to a power transfer box lubrication device, and, more particularly, to a gearbox lubrication device.

BACKGROUND OF THE INVENTION

Power transfer devices, such as a transmission or a pump drive gearbox typically lubricate the gears by at least one of the gears being partially submerged in a reservoir of lubricating oil, causing the oil to be splashed about the interior portions of the box. There can even be protrusions from portions of the gear to cause more oil to splash about the interior of the gearbox. This is a random type of lubrication that has been utilized in many power transmission type devices with the assumption that the lubrication will eventually get to the needed places by it being randomly splashed about the interior of the gearbox and onto the moving parts therein.

Broadly, a gearbox can be thought of as a device that converts rotational speed and torque into another speed and torque and is often utilized in vehicles powered by an engine that provides a rotational torque source of power where the gearbox alters the speed and torque output to a desired level. Gearboxes are also used in a wide variety of stationary applications such as wind turbines. Gearboxes are also used in agricultural, industrial, forestry, construction, mining, as well as automotive equipment. Gearboxes can be thought of as a simple type of transmission often used to reduce speed or provide a change in direction of the rotating power. Usually, the distinction is that a gearbox has a gear ratio that does not change during use and is fixed at the time the gearbox is constructed. In contrast to the construct of a gearbox, a transmission has the capacity for different gear ratio selections. The lubrication of a gearbox can be impacted by the orientation of the gearbox as well as the temperature and torque being applied thereto. Gearboxes can also be dry sumped, having an external pump and external reservoir for lubrication oil.

What is needed in the art is a system to more efficiently lubricate the gears in a gearbox to allow for the more efficient running of the gearbox at a lower temperature.

SUMMARY OF THE INVENTION

The present invention provides a power transfer device with a lubrication system directing lubricant into the mesh of the gears.

The invention, in one form thereof, is directed to a vehicle having a power generating device and a power transfer device. The power transfer device includes a plurality of gears in a housing within which the plurality of gears rotate. The plurality of gears include a first gear and a second gear, the first gear meshing with the second gear. The housing has a lubrication passage. The housing also has a lubrication slot and/or a spray nozzle in fluid communication with the lubrication passage. The lubrication slot and/or spray nozzle direct the fluid flowing therethrough toward where the first gear and second gear mesh.

BRIEF DESCRIPTION OF THE DRAWINGS

The above-mentioned and other features and advantages of this invention, and the manner of attaining them, will become more apparent and the invention will be better understood by reference to the following description of embodiment of the invention taken in conjunction with the accompanying drawings, wherein.

DESCRIPTION OF THE PREFERRED EMBODIMENT

Figure 1:
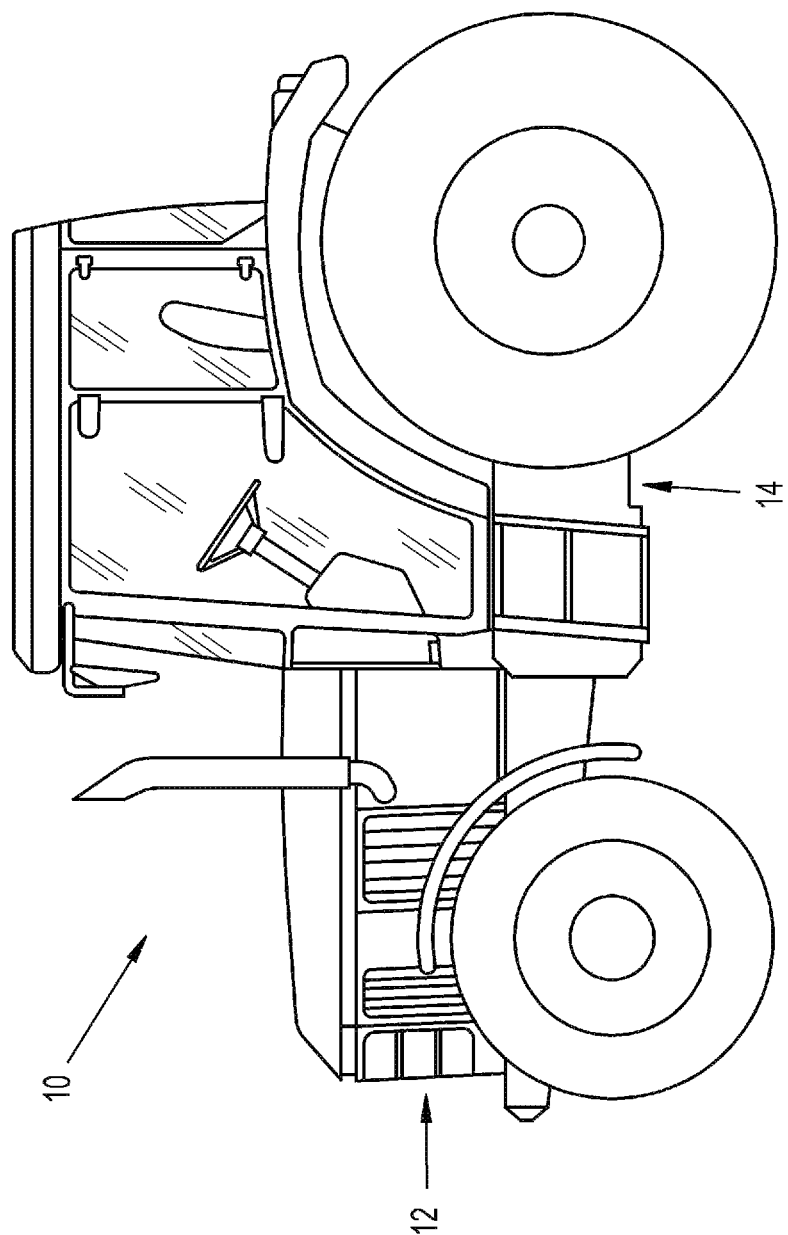
FIG. 1 is a side view of a vehicle using a gearbox having an embodiment of a gear lubrication device of the present invention.

Referring now to the drawings, and more particularly to FIG. 1, there is shown a vehicle 10 having a power generating device 12 and a power transfer device 14. Vehicle 10 is shown as an agricultural vehicle, although it is recognized that other vehicles, such as construction vehicles, forestry vehicles, industrial vehicles, mining vehicles and the like can be platforms that incorporate an embodiment of a gearbox of the present invention. Power generating device 12 may be a diesel engine that provides mechanical rotary motion to power transfer device 14. Power transfer device 14 may be a gearbox or other similar device having rotating gears therein for the purpose of transferring torque and converting it to a different speed and/or direction.

Figure 2:
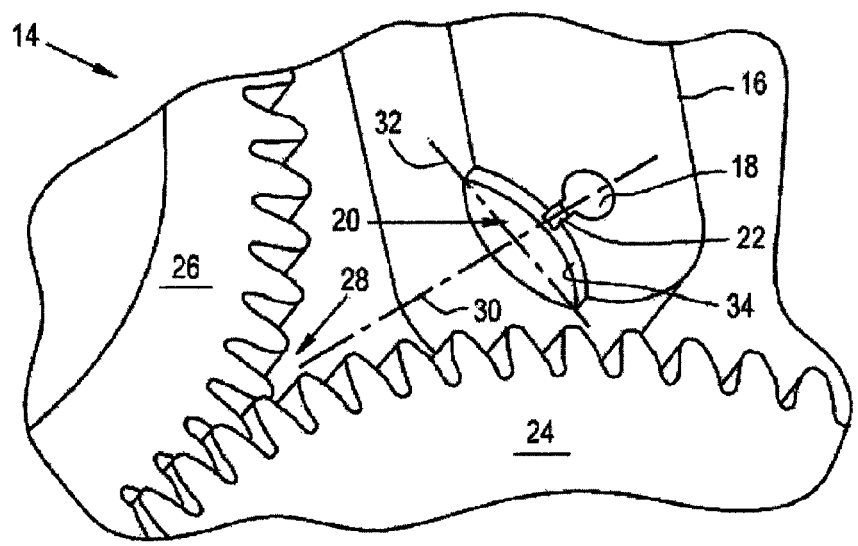
FIG. 2 is a partial cross section perspective view of the gearbox used by the vehicle of FIG. 1; and, FIG. 3 is a schematical, partially sectioned view of the housing of the gearbox of FIG. 2.
Figure 3:
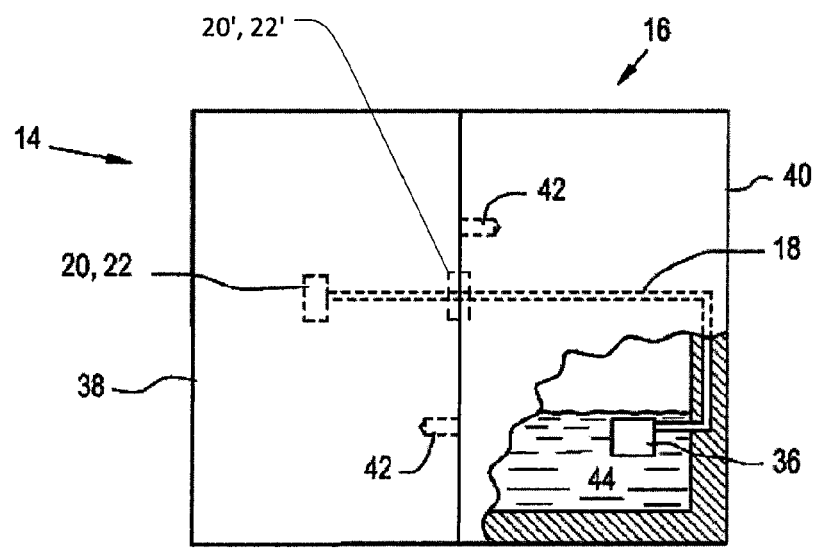

Now, additionally referring to FIGS. 2 and 3, there is illustrated power transfer device 14, which includes a housing 16, having a lubrication passage 18 therein. Lubrication passage 18 is in fluid communication with lubrication slot 20 and spray nozzle 22. Fluid passing through lubrication passage 18 then flows first through spray nozzle 22 and then lubrication slot 20 as it is directed towards first gear 24 and second gear 26 and, more particularly, to meshing area 28, which is an area in which gear 24 and gear 26 mesh together. Lubrication slot 20 and spray nozzle 22 are generally oriented along tangent line 30. Tangent line 30 is the line that is tangent to both gears 24 and 26 where they mesh in meshing area 28. Lubricant passing through lubrication passage 18 is directed by spray nozzle 22 through lubrication slot 20, with lubrication slot 20 further orienting the pattern and direction of the lubricant as it passes toward meshing area 28. The lubricant is advantageously placed into meshing area 28 to enhance the efficiency of the power transfer between gears 24 and 26. Although only one set of gears 24 and 26 is illustrated, which have, in this case, parallel axes of rotation, other types of gears as well as a number of gears are contemplated with more than one lubrication slot 20 and spray nozzle 22 directed to other meshing areas of the other gear sets.

Lubrication slot 20 has a long axis 32 that is generally perpendicular to the rotational axes of gears 24 and 26. Long axis 32 may generally intersect tangent line 30, illustrating a symmetry regarding the orientation and positioning of lubrication slot 20. Spray nozzle 22 may simply be a machined opening through part of housing 16 connecting lubrication passage 18 with lubrication slot 20. As lubricating fluid flows through spray nozzle 22, it may be reoriented by slot 20 to provide a particular spray pattern in meshing area 28 with additional lubricating fluid arriving on areas of gears 24 and 26 prior to their meshing. In FIG. 2, it is anticipated that gear 24 is moving in a counterclockwise direction and gear 26 is moving in a clockwise direction so that meshing area 28 is receiving lubricant before gears 24 and 26 come into contact with each other.

Lubrication slot 20 additionally has a generally curved surface 34 that may shaped having a fixed radius, although other shapes are also contemplated. The surface illustrated in FIG. 2 in which lubrication passage 18 is shown may be a cross sectional area or may be along a parting line as shown in FIG. 3 that exists between portion 38 of housing 16 and portion 40 of housing 16 (e.g., as with example lubrication slot 20' and example spray nozzle 22'). If slot 20 that is to be machined is located along the parting line (e.g., as example lubrication slot 20') then only one portion of housing 16 may be machined. In the schematical illustration of FIG. 3, lubrication slot 20 and spray nozzle 22 are schematically shown as being a part of housing portion 38 while lubrication passage 18 exists all of the way from lubrication pressurization device 36 through both portions 38 and 40 of housing 16. In order to ensure that lubrication passage 18 is continuous from portion 38 through portion 40, alignment features 42 in the form of pins and corresponding cavities provide for the alignment of portions 38 and 40. Lubricating fluid 44 is illustrated as existing within housing 16, although in other configurations, such as a dry sump, lubrication pressurization device 36, which may be a pump, is located outside of housing 16 along with fluid 44 being held in a separate reservoir.

Advantageously, housing 16 is configured so that portions 38 and 40 join together at a specific location and have a machined lubrication slot 20 and/or a spray nozzle 22, which directs oil into meshing area 28. Fluid 44 is supplied to spray nozzle 22 and lubrication slot 20 by the machined lubrication passage 18 in housing 16, which is a part of a lubrication circuit that flows from a reservoir where lubrication 44 is shown in FIG. 3 through lubrication pressurization device 36, through lubrication passage 18, through lubrication spray nozzle 22, and then through lubrication slot 20 into meshing area 28 where the lubricant once disbursed will eventually find its way back to the reservoir to complete the circuit again.

The present invention advantageously is cost effective, utilizing elements of the housing and not requiring the insertion of new parts for the directing of the fluid to the meshing area of the gears.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A vehicle, comprising:
a power generating device; and
a power transfer device coupled to said power generating device, said power transfer device including:
a plurality of gears including a first gear and a second gear, said first gear meshing with said second gear at a meshing area; and
a housing within which said plurality of gears rotate, said housing having a first portion and a second portion having surfaces that meet along a parting line, a lubrication passage extending to said parting line through one or more of said first and second portions of said housing, a lubrication slot formed in said first portion of said housing and extending between said first and second portions of said housing along said parting line, and a spray nozzle in fluid communication with said lubrication slot and said lubrication passage, said spray nozzle having a lesser area than said lubrication passage;
wherein said spray nozzle provides a fluid flow path between an inlet to said spray nozzle from said lubrication passage and an outlet from said spray nozzle to said lubrication slot; and
wherein said lubrication slot is bounded by an opening communicating with said meshing area and by an edge surface transverse to said spray nozzle at said outlet, said edge surface defining an opening for fluid flow from said outlet of said spray nozzle into said lubrication slot, said lubrication slot directing a fluid flowing through said outlet of said spray nozzle and said opening of said lubrication slot toward said meshing area.

2. The vehicle of claim 1, wherein at least one of said lubrication slot and said spray nozzle is generally aligned with a tangent line extending from said meshing area.

3. The vehicle of claim 2, wherein said lubrication slot has a generally oblong shape, with a shorter axis and a longer axis, the longer axis being generally oriented perpendicular to a rotational axis of said first gear.

4. The vehicle of claim 3, wherein said edge surface of said lubrication slot is a generally curved surface.

5. The vehicle of claim 1, wherein said power transfer device further includes a lubrication pressurization device that feeds said fluid into said lubrication passage.

6. The vehicle of claim 5, wherein said first portion and said second portion are oriented with respect to each other so as to align a first section of said lubrication passage passing through said first portion with a second section of said lubrication passage passing through said second portion.

7. A power transfer device comprising:
a plurality of gears including a first gear and a second gear, said first gear meshing with said second gear at a meshing area; and
a housing within which said plurality of gears rotate, said housing having a first portion and a second portion having surfaces that meet along a parting line, a lubrication passage extending to said parting line through one or more of said first and second portions of said housing, a lubrication slot formed in said first portion of said housing and extending between said first and second portions of said housing along said parting line, and a spray nozzle in fluid communication with said lubrication slot and said lubrication passage, said spray nozzle having a lesser area than said lubrication passage;
wherein said spray nozzle provides a fluid flow path between an inlet to said spray nozzle from said lubrication passage and an outlet from said spray nozzle to said lubrication slot; and
wherein said lubrication slot is bounded by an opening communicating with said meshing area and by an edge surface transverse to said spray nozzle at said outlet, said edge surface defining an opening for fluid flow from said outlet of said spray nozzle into said lubrication slot, said lubrication slot directing a fluid flowing through said outlet of said spray nozzle and said opening of said lubrication slot toward said meshing area.

8. The power transfer device of claim 7, wherein at least one of said lubrication slot and said spray nozzle is generally aligned with a tangent line extending from said meshing area.

9. The power transfer device of claim 8, wherein said lubrication slot has a generally oblong shape, with a shorter axis and a longer axis, the longer axis being generally oriented perpendicular to a rotational axis of said first gear.

10. The power transfer device of claim 9, wherein said edge surface of said lubrication slot is a generally curved surface.

11. The power transfer device of claim 7, further comprising a lubrication pressurization device that feeds said fluid into said lubrication passage.

12. The power transfer device of claim 11, wherein said first portion and said second portion are oriented with respect to each other so as to align a first section of said lubrication passage passing through said first portion with a second section of said lubrication passage passing through said second portion.

\* \* \* \* \*